J. N. SCISM.
JUNCTION BOX COUPLING FOR ELECTRIC CONDUITS.
APPLICATION FILED DEC. 21, 1911.
1,254,633. Patented Jan. 22, 1918.
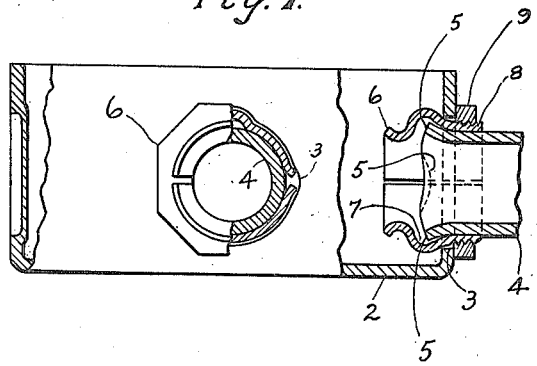
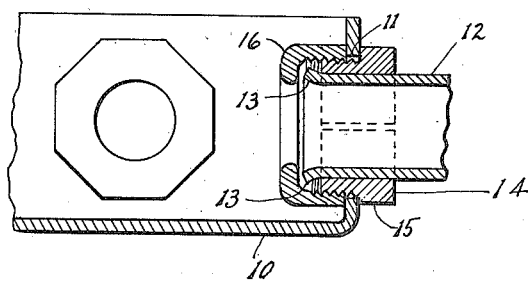
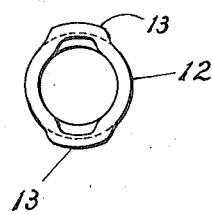
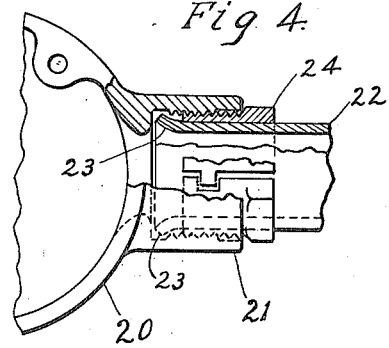
INVENTOR
John N. Scism
BY
*[signature]*
ATTORNEY

UNITED STATES PATENT OFFICE.

JOHN N. SCISM, OF BROOKLYN, NEW YORK.

JUNCTION-BOX COUPLING FOR ELECTRIC CONDUITS.

1,254,633.  Specification of Letters Patent.  Patented Jan. 22, 1918.

Application filed December 21, 1911. Serial No. 667,146.

*To all whom it may concern:*

Be it known that I, JOHN N. SCISM, a citizen of the United States, residing in the city of New York, borough of Brooklyn, county of Kings, and State of New York, have invented a certain new and useful Junction-Box Coupling for Electric Conduits, of which the following is a specification.

This invention relates to a junction box coupling for electric conduits. The object of the invention is to provide a means by which a workman can in a quick, ready and easy manner effect a coupling of a cut length of conduit to a junction box at the place of installation of the box.

In the drawings accompanying and forming part of the present specification I have shown in detail several forms of embodiment of the invention, which to enable those skilled in the art to practice the same will be set forth fully in the following description. The novelty of the invention will be set forth in the claims following said description. I do not restrict myself to the precise disclosure; I may depart therefrom in several respects within the scope of the invention defined by said claims.

Referring to the drawings:

Figure 1 is a view, partly in elevation and partly in vertical section, illustrating a junction box, a conduit in the form of a pipe, and means for coupling said conduit or pipe and the junction box firmly together.

Fig. 2 is a view partly in vertical section and partly in elevation, illustrating another embodiment of the coupling means in connection with the conduit and the junction box.

Fig. 3 is a detail view in end elevation of the conduit employed in connection with the structure of Fig. 2.

Fig. 4 is a plan view partly in horizontal section, illustrating a coupling means between the junction box and the conduit positioned exteriorly with respect to said junction box.

Like characters refer to like parts throughout the several views.

When the workman is engaged in installing junction boxes and a conduit, it frequently happens that the length of pipe needed between two junction boxes is such that it becomes necessary to cut the pipe length in order to fit the space between them.
The pipes are supplied to the workman in predetermined lengths, usually about ten feet, and difficulty has heretofore been experienced in hand-threading and coupling the pipe to the junction box, after cutting the pipe to the required length. It is an easy matter to couple the adjacent ends of two ordinary uncut pipes, for the reason that each pipe length is bought in the market, threaded at one end and provided with a coupling member at the other end, whereby the coupling member of one pipe length is adapted to be screwed to the threaded end of the other pipe length; but when the pipe is cut to fit any special or predetermined space between the junction boxes, then the workman is confronted with the problem of attaching the end of the unthreaded cut pipe length to the junction box. It is at this point in the installation of the conduit that my invention becomes of utility and great importance in this particular art, for the reason that said invention furnishes means whereby the cut end of the pipe length may be more readily fashioned by the workman while on the job and more easily and quickly attached to the junction box.

It will, therefore, be clear that the invention comprises a junction box, a conduit extending into said junction box and having a manually bent outwardly extending lip, the transverse extent of which is less than the length of the circumference of the conduit, an annular coupling sleeve having means to receive said lip, and means connected with the sleeve, to retain the conduit in fixed relation with the box. While this lip may be manually bent outwardly in any suitable manner, I can accomplish the result in a satisfactory manner by the use of the bending tool shown in Letters Patent No. 1,159,806, issued to me November 9, 1915. There may be cases as will be understood where the end of a previously cut or other pipe section may have several of these lips.

Referring first to Fig. 1 I have shown a junction box 2 having in its walls several openings 3 presenting suitable openings to receive conduits as 4. The conduits and their associated means being the same, it is necessary to describe merely but one of them. It will be assumed that a conduit or pipe as 4 has been cut by the workman to the requisite length. After this the workman for instance by the use of the tool referred to in the Letters Patent already identified or otherwise will form on the cut end of the pipe one or more lips as 5. Obviously the width or transverse extent of each lip will be less that the length of the circumference of the conduit or pipe. As shown after the conduit or pipe is lipped, it will be passed through the appropriate opening 3 into the junction box. Associated with the lipped end of the conduit 4 is a coupling sleeve as 6. This coupling sleeve as shown inside the box has an annular groove 7 constituting a suitable seat to receive the lip or lips 5. Said sleeve, although it receives the lip within the box extends exteriorly of the box, its externally projecting end being threaded on the outside as at 8 to receive the coupling sleeve 9 which when set abuts against the box.

In Figs. 2 and 3 I have shown a further form of the invention, the junction box being denoted by 10 and having openings as 11 to receive conduits as 12. The conduit 12 in each case extends into the box 10 by way of the appropriate opening 11, and it has two of such lips 13 which may be formed as already described. Associated with the cut and lipped conduit 12 is a coupling sleeve 14 which slips over that part of the conduit 12 which extends into the box 10, the coupling sleeve having an external shoulder 15 which engages against the outer face of the surface of the box. The inner threaded portion of the coupling sleeve within the box receives the nut 16 which when set maintains the joint. The lipped portion of the conduit 12 as already observed is within the box 10, and it will be noted that when the shoulder or enlarged portion 15 of the coupling sleeve engages against the outer surface of the box, the inner edge of the nut will be substantially against the lips 13, this relation being maintained by the nut 16.

Referring now to Fig. 4. The junction box is here denoted by 20, being furnished with an exterior nipple 21 which receives the conduit 22 having at its inner end one or more lips as 23 made for instance as already described. The inner lipped end of this conduit 22 it will be seen, abuts against the junction box 20. Associated with the conduit 22 is a coupling sleeve 24 which has a threaded engagement with the nipple 21, obviously the threads of the sleeve being external to engage internal threads on the nipple. When the coupling sleeve is driven home, its inner edge will be in adjacence to the lip or lips 23 to prevent the joint being accidentally broken.

What I claim is:

1. The combination of a junction-box, a conduit extending into said junction-box and having a manually-bent outwardly extending lip, the transverse extent of which is less than the length of the circumference of the conduit, the box being provided with a part having a seat to receive said lip, and means connected with said part, to retain the conduit in fixed relation with the box.

2. The combination of a junction-box, having an opening, a conduit extending into the junction-box through said opening, the conduit within the box having a manually-bent outwardly extending lip, the transverse extent of which is less than the circumference of the conduit, an annular coupling sleeve having an annular groove to receive said lip, and securing means having threaded engagement with the coupling sleeve and acting to retain the conduit in fixed relation with the junction box.

In testimony whereof I have signed this specification in the presence of two subscribing witnesses.

JOHN N. SCISM.

Witnesses:
J. F. MOTHERSHEAD,
M. C. RODRIGUEZ.